2,877,180
FRACTURING LIQUID AND METHOD OF USE THEREOF IN TREATING WELLS

Arthur Park and Albert W. Coulter, Jr., Tulsa, Okla., assignors to The Dow Chemical Company, Midland, Mich., a corporation of Delaware No Drawing. Application October 22, 1956
Serial No. 617,239

4 Claims. (Cl. 252—8.55)

This invention relates to an improved hydraulic fracturing liquid and method of fracturing fluid-bearing earth strata or formations penetrated by a well by injecting therein the fracturing liquid to increase the productivity of fluids from such formations. It more particularly relates to a hydraulic fracturing liquid and the method of use thereof which results in a substantial reduction in loss of such fracturing liquids.

Fluids contained in the pores of subsurface earth strata or formations are free to move only when such strata or formations are permeable to some degree. The greater the degree of permeability of the strata, the less resistance is offered to the movement of the fluid therethrough or therefrom. Furthermore, although the strata or formations in which a fluid is contained are permeable, a fluid contained therein moves only when subjected to a pressure due either to natural or artificial causes. It is therefore necessary that a permeable formation containing fluids not be sealed off by impermeable barriers. As a result of these inherent conditions necessary for the movement of fluids in and through underground formations, valuable fluids remain locked in earth strata which (1) are not permeable or (2) are not accessible to outside pressures.

When a stratum or formation containing a valuable fluid such as water, brine, oil, or natural gas, is penetrated by a well, such stratum or formation is generally sufficiently permeable to permit some passage therethrough of the fluid. There may be a sufficient pressure difference set up by penetration of cap rock or of a formation by the well to cause the fluid to move by natural causes into the well and to rise some distance in the well. In some instances, the pressure difference is great enough to cause the fluid to rise to the surface of the ground and thus result in a flowing well. More frequently, however, the difference in pressure is not sufficient to cause the fluid to rise to the surface of the ground; or if sufficient when the formation is first penetrated, falls off and becomes insufficient after a time. Artificial means such as gas and air lifts, water or gas displacement, and pumps are used to create a pressure difference which is sufficient to cause the fluid to move to the well and to be brought to the surface of the ground. Production of fluids from a fluid-bearing formation continues from the well by either natural or artificial means only so long as the formations between the fluid in place and the well provide passage therethrough by communicating pores, channels, fissures, or the like.

The productivity of wells, such as oil and/or gas wells has been found to decrease, despite the employment of means for increasing the pressure difference between the well and the fluid-bearing formation, to the point where production costs far exceed the value of the oil or gas being produced before the oil or gas in the producing strata or formations has been substantially removed. Various methods of increasing the rate of flow and lengthening the production life of wells have been proposed. Explosives have been used to fracture earth strata and thus provide communicating passages in formations of low permeability. Difficulties of control of the fracture produced and accompanying hazards have restricted their use. Enlarging the well bore and horizontal drilling have been attempted. However, the increase in production resulting therefrom has seldom proved the attempt to have been economically worthwhile.

More effective means of increasing production known to the art are acidizing and hydraulic fracturing. Acidizing is used in acid-soluble formations such as those comprising limestone or dolomite and is not effective in predominantly sandstone formations. Acidizing consists essentially of injecting an aqueous solution of HCl, containing an inhibitor to metal attack, e. g., arsenic acid, into a well requiring treatment, which reacts with the calcium carbonate, for example, which is present in the formation to form the water-soluble calcium chloride, carbon dioxide, and water. Hydraulic fracturing, may be used in acid-soluble and acid-insoluble formations and broadly refers to injecting a liquid, usually thickened oil, preferably containing suspended particulate solids, such as sand, into the well. The thus-injected liquid is subjected to a high pressure to effect fracturing of formations penetrated by or contiguous to the well bore, thereby forming cracks therein. The suspended particulate solids, if present, are thus forced by the pressure into the cracks and act as a prop to prevent the cracks from closing.

Even though the fracturing liquid is thickened, it nevertheless oftentimes seeps into the formation so that it is difficult at times to put it under high pressure in the well to fracture the formation.

The principal object of the present invention is to provide an improved fracturing liquid which resists wasteful seepage into the earth formations and a more economical method of fracturing earth formations than are presently known. Other objects and advantages will become apparent as the description of the invention proceeds.

The invention is predicated upon the discovery that a material which is insoluble in conventional acid fracturing liquids, below a given pH value, becomes soluble upon the acid present in such liquids being spent and the pH rising above that value after injection into the well formation. The material present in an undissolved state affords a novel and convenient method of reducing loss of fracturing liquid after its injection into the well being treated and prior to the actual fracture of a contiguous formation. After the formation has been fractured, the rise in pH causes the material to go into solution and the solution thus formed to penetrate the newly formed fissures and thereafter to be easily removed from the well.

The material to be employed in the invention is an alkali lignin, preferably containing a substantial proportion of sodium lignate, which is soluble in neutral and alkaline media but which forms insoluble lignin in acid media. Alkali lignins are commonly prepared from the black liquor formed as a by-product during commercial sulfate wood pulping operations. The preparation of lignate is described in Hagglund, Chemistry of Wood (1951), pp. 474–487. Alkali lignins are readily available at low cost since the spent sulfate liquors produced as a by-product have heretofore greatly exceeded the demand therefor.

Lignin is substantially insoluble in an acid well-treating preparation, such as an acidizing solution acidified or fracturing liquid. The lignin, however, in the amount employed in the invention, is readily suspendable in the acid-treating preparation and remains suspended therein to form a slurry for sufficient time thereafter to permit the slurry to be pumped into a well without substantial settling of the lignin.

In practicing the invention, a treating slurry consisting of lignin dispersed in an acid fracturing liquid which may be used directly as such solution or as an emulsion with an oil. As the injection into a well proceeds, pressure is applied so that the slurry is carried to all exposed portions of the contiguous formation, particularly to those exposed portions which offer least resistance to flow of the slurry. The lignin, being insoluble, settles out, principally at the more exposed portions of the formation forming thereby a thin filter cake which is substantially impermeable and therefore plugs the fissures and channels leading from the well and thereby forms a more or less impermeable seal in the fissures and channels and prevents serious loss of the slurry therethrough. By being thus prevented from escaping through such channels and fissures, the slurry is forced into contact with the exposed faces of the tighter portions of the formation. The pressure continues to build up until there is a somewhat sudden decline in pressure indicating that a fracture has occurred in the formation or there may be a series of rises and declines in pressure indicating a number of succeeding fractures and subsequent penetrations of the fluid.

After injection into the formation, the acidified slurry interacts with components of the earth formation to produce water-soluble materials, e. g., chlorides or magnesium and calcium, and the slurry becomes mixed with and diluted by the fluid contents of the formation so that the acid content becomes spent.

As the acid in the slurry thus becomes spent, the pH value rises, the result of which is a pronounced increase in solubility of the lignin in the fluid content of the well and consequently its dissolution therein.

Injection of the fracturing liquid containing the lignin and fracturing the formation according to the invention are followed by pumping oil, usually crude oil, down into the well under pressure to force the fracturing liquid into cracks and recesses of the formation including those newly formed. After the fracturing treatment the pressure is released which results in the fracturing liquid flowing back out of the formation to the wellbore from which it is easily removed.

An alkali lignin suitable for the process of the invention is a substantially free-flowing powder, usually tan to dark-brown or black in color and substantially insoluble in an aqueous medium having a pH below 3. A sample of a commercially available alkali lignin suitable for the invention analyzed as follows:

Table I

| Property: | Value |
|---|---|
| Moisture, weight percent | 8.3 |
| Ash, weight percent | 22.5 |
| pH of aqueous solution | 9.3 |
| Methoxyl, weight percent | 11.5 |
| Sulfur, weight percent | 1.8 |
| Apparent density, lbs. per cu. ft | 30.0 |
| Specific gravity | 1.6 |

The effect on the solubility in water of an alkali lignin having the above analysis by decreasing the pH value, by making gradual additions of 1 N hydrochloric acid, was ascertained. The results are set out in Table II:

Table II

| Test | pH | Weight Percent Alkali Lignin Soluble in Water or Acidified Water Solution |
|---|---|---|
| 1 | 7 | 20. |
| 2 | 6 | 13. |
| 3 | 5 | 5. |
| 4 | 4 | 1. |
| 5 | 3 | 0.001. |
| 6 | 2 | Less than 0.001. |

Reference to Table II shows the definite and marked decrease in the solubility of alkali lignin at decreased pH values.

The effect on the liquid loss at 80° F. of dissolving varying amounts of an alkali lignin, having the above analysis, in an aqueous acidizing solution containing 15 percent of HCl was determined according to the fluid loss test of the Division of Production of the American Petroleum Institute, A. P. I., R. P. Code 29, as set out in "Recommended Practice for Standard Field Procedure for Testing Drilling Fluids," 3rd. ed. (May 1950). The results of the tests are set out in Table III:

Table III

| Test | Concentration of Alkali Lignin in Lb./1,000 Gal. of Acid Solution | Fluid Loss (API Code 29) |
|---|---|---|
| 7 | None | 400 ml. in 20 seconds. |
| 8 | 12 | 400 ml. in 28 minutes. |
| 9 | 25 | 370 ml. in 30 minutes. |
| 10 | 50 | 290 ml. in 30 minutes. |
| 11 | 100 | 240 ml. in 30 minutes. |
| 12 | 200 | 180 ml. in 30 minutes. |

The effect of dissolving varying amounts of an alkali lignin having the above analysis on the liquid loss of an oil-aqueous acid fracturing emulsion comprising the lignin slurry were determined according to API Code 29. The fracturing fluid was composed of the following components in parts by volume: 90 parts of 15 weight percent HCl, 9.7 parts kerosene, and 0.3 part dioctyldimethyl ammonium chloride emulsified together. The results of the test are set out in Table IV:

Table IV.—Effect of alkali lignin on fluid loss

| Test | Lb. Lignin/ 1,000 Gal. of Slurry | Temp., ° F. | Fluid Loss (API Code 29) |
|---|---|---|---|
| 13 | None | 80 | 400 ml. in 25 seconds. |
| 14 | 2.5 | 80 | 300 ml. in 30 minutes. |
| 15 | 5.0 | 80 | 97 ml. in 30 minutes. |
| 16 | 15.0 | 80 | 38 ml. in 30 minutes. |
| 17 | 15.0 | 150 | 60 ml. in 30 minutes. |
| 18 | 25.0 | 80 | 20 ml. in 30 minutes. |
| 19 | 40.0 | 80 | 13 ml. in 30 minutes. |

Alkali lignins may be employed in the invention in an amount between 1 and 200 pounds per 1000 gallons of acidizing or fracturing liquid to be used. It is preferred that the amount of alkali lignin be between 2 and 100 pounds per 1000 gallons.

The pH value of a suitable well-treating preparation in accordance with the invention such as an acidizing solution or fracturing slurry is to be no higher than 3. Best results are obtained at a pH value of less than 2. The acid concentrations of the acidizing or fracturing slurry may be those commonly employed, e. g., from 5 to 20 percent of HCl by weight of the treating preparation. However, if it is desired, lower or higher concentrations of HCl may be used.

Oil, useful in the embodiment of the invention employing an emulsion, may be derived from crude petroleum and, when treating oil wells, the oil used is usually derived from crude having similar properties to the crude in the formation being treated. The oil may be kerosene, diesel oil, fractions from refineries, or blends of lighter and heavier fractions including cracked and straight run blends.

When sand is injected into the well along with the oil-aqueous acid emulsion, the sand preferred is that of a particle size such that at least 90% of it will pass through a number 6 standard sieve but will be retained on a number 100 standard sieve, United States Bureau of Mines series. Ottawa sand is a particular satisfactory sand to employ.

In carrying out the invention, a fracturing liquid is first prepared according to known methods. For the purposes of this invention, a fracturing liquid may be any solution, dispersion, or slurry which is injected into a well and subjected to a pressure. It may be an acidizing solution such as a 5 to 20 weight percent aqueous solution of HCl containing a corrosion inhibitor, e. g., 0.1 to 5 percent of an arsenic compound or other suitable corrosion inhibitor such as a small amount of an organic sulfur or nitrogen base compound. It may be an emulsion of acidified water and kerosene or diesel oil with or without suspended solid particles, e. g., sand. Any suitable emulsifying agent may be used to effect emulsification of the oil and aqueous phases. Among such well known emulsifying agents are quaternary alkyl ammonium halides, e. g., dioctylidimethylammonium chloride.

The lignin powder is then dispersed into the acid fracturing liquid thus prepared to form a slurry. The lignin is preferably first dissolved in water and added to the fracturing liquid as an aqueous solution. Any commonly used mixing apparatus, e. g., a paddle tank mixer, may be used.

The well to be treated according to the invention may or may not have tubing therein. If desired, the well may be flushed out, prior to treatment, by a suitable oil, e. g., crude oil.

If the well is provided with a string of tubing, it usually extends down in the casing to a point which is just above the formation to be fractured, and a packer is set in the annulus formed between the tubing and casing usually near the lower end of the tubing string. Water may be pumped into the annulus above the packer to lessen the danger of "blowouts" when fracturing pressure is applied below the packer.

In carrying out the steps of fracturing a formation according to the invention, a slurry, consisting of the fracturing liquid containing suspended lignin, is injected into the well. It is usually desirable to feed sand into the well with the fracturing fluid to act as a prop as stated heretofore. Since the slurry, like any other liquid under comparable conditions, first flows into the readily communicating pores and existent fissures and cracks offering least resistance, these pores, fissures and cracks are soon plugged to a large extent by the deposition of the lignin forming a thin filter cake therein. As the injection continues, the slurry is carried to the exposed areas of the tighter portions of the formation which also are subsequently coated with deposited lignin forming a more or less impermeable thin filter cake. The pressure, which had been rising comparatively slowly up to this point, begins to rise rapidly at this stage due to the plugging of the pores and cracks leading from the well. Further injection is accompanied by greater pressure in the well until there is a rather sudden drop in pressure indicating a fracture in the formation. A fluid, usually one quite similar to the fluid in the formation being treated, is then pumped into the well. The pressure is maintained for a time during which the acid content of the fracturing liquid is spent and, due to the rise in PH, the lignin is dissolved. The lignin then being dissolved, the resulting solution is forced back into cracks and channels leading away from the wellbore. The pressure is thereafter released and the solution flows readily back to the wellbore. The well is then ready to be put back into production.

The following steps illustrate the general practice of fracturing a formation penetrated by a well in accordance with the invention:

To treat a 3000 foot well, cased with a 7" pipe with 10 feet of perforations 20 feet off bottom, penetrating a predominantly limestone formation from which production had fallen off, a slurry is prepared by dissolving 25 pounds of the alkali lignin which showed the analysis given herein above in 25 gallons of water contained in a 50 gallon mixer. After the lignin is dispersed, the resulting solution is admixed with 1,000 gallons of 15 percent aqueous HCl solution containing an arsenic corrosion inhibitor. The resulting mixture is agitated to disperse the lignin uniformly to form a substantially homogeneous slurry.

The well may be flushed with crude oil. A packer is positioned near the lower end of the well tubing at a point above the end of the perforated casing which extends on down into the formation to be fractured. The above-prepared slurry is injected into the well by pumping it down the tubing. As the injection continues, the pressure gradually increases until a perceptible drop in pressure is observed, indicating that a fracture has occurred. The acid-lignin slurry is followed by 10 barrels of crude oil to force the fracturing liquid back into the more remote pores and cracks of the formation. The pressure is then released and the well is put back in production.

The presence of the tubing is unnecessary. Wells may be successfully treated according to the invention without tubing being present by merely pumping the fracturing liquid containing the lignin down the casing.

The following example is another illustration of a mode of practicing the invention.

A well producing from a Topeka limestone formation at a depth of 2970 to 2980 feet and producing 15 barrels of oil and 12 barrels of water per day was treated according to the invention.

To prepare the aqueous acid-oil emulsion for use in treating the well employing this embodiment of the invention, the procedure set out below was followed for the preparation of each 1000 gallons of fracturing liquid. Seven thousand gallons of fracturing liquid were used in fracturing the well.

The oil for use in preparing the aqueous acid-oil emulsion was prepared by admixing 42 gallons of kerosene and 5 gallons of xylene with 3 gallons of dioctyldimethylammonium chloride as an emulsifying agent in a paddle tank mixer.

Fifteen pounds of the alkali lignin having the analysis given above were dispersed in 15 gallons of water. The resulting solution was then added to the oil containing the emulsifying agent in the paddle tank. 935 gallons of 15% inhibited aqueous HCl solution were admixed with the mixture in the mixing tank and emulsification effected.

One thousand gallons of the fracturing liquid of the invention was thus prepared. Proper proportions of the amounts given may be used to make any desired size batch.

Sand composed of particles which passed through a number 20 standard sieve but were retained on a number 40 standard sieve was placed in a convenient position to be mixed into the fracturing liquid as it was passed into the well tubing.

The mixture in the mixing tank, while continuing to be agitated, was pumped into the well tubing, while simultaneously therewith, the sand was proportionally added at the rate of 1 pound of sand per gallon of aqueous acid-oil emulsion containing the suspended lignin. The time taken to pass the emulsion and sand into the well was 15 minutes. During injection the pressure rose to 2700 p. s. i. measured as back pressure at the well head. The presure then dropped off indicating a fracture. The contents of the tubing were then flushed back into the formation by pumping 105 barrels of crude oil into the tubing. The well while under pressure was closed off for about 10 minutes to force the fracturing liquid well back into the formation.

The well was then put back into production and produced 37 barrels of oil per day, an increase of 150 percent.

From an examination of the examples, it is apparent that the novel fracturing liquid consisting of an acidizing solution or an aqueous acid-oil emulsion into which alkali lignin has been admixed in accordance with the invention provides a satisfactory and highly valuable means of increasing productivity from wells penetrating formations of low permeability.

What is claimed is:

1. The well-treating composition consisting essentially of an aqueous acidic solution, a liquid hydrocarbon, an emulsifying agent sufficient to form an emulsion of the aqueous acidic solution and the hydrocarbon, between 0.1 and 5.0 percent of a corrosion inhibitor, between 1 and 200 pounds of lignin per thousand gallons of the emulsion, and between 0.1 and 8.0 pounds of sand per gallon of composition, said sand having a particle size at least 90 percent of which will pass through a number 6 standard sieve but will be retained on a number 100 standard sieve said composition having a pH of less than 3.

2. A well-treating liquid composition comprising a 5 to 20 percent aqueous solution of HCl by weight, a liquid hydrocarbon in an amount between about 90 and 95 parts of the aqueous solution to between about 10 and 5 parts by weight of the hydrocarbon, an emulsifying agent sufficient to form an emulsion of the aqueous solution and hydrocarbon, and between 1 and 200 pounds of lignin per 1000 gallons of the emulsion.

3. In a method of fracturing a fluid-bearing earth formation penetrated by a well by injecting into the well an acidic fracturing liquid selected from the class consisting of an aqueous solution of hydrochloric acid and an emulsion of an oil and aqueous hydrochloric acid, the improvement consisting essentially of suspending in said acidic fracturing liquid an alkaline-soluble and water-soluble lignin which is insoluble in said acid liquid to make a slurry, injecting the slurry into the formation under pressure so that the slurry is forced into the more exposed fissures and recesses to form a filter cake therein to prevent excessive loss of said liquid, continuing the presure to cause further penetration of the less exposed fissures and recesses in tighter portions of said formation, fracturing the formation, causing said slurry to raise its pH value to effect dissolution of the lignin and form a solution thereof, adding an oil to the well to force the resulting solution back into the more remote portions of the formation, and releasing the pressure on the well.

4. The method according to claim 3 wherein sand having a particle size such that at least 90 percent thereof will pass through a number 6 standard sieve but will be retained on a number 100 standard sieve is fed into the well simultaneously with said liquid composition at the rate of 0.1 to 8.0 pounds per gallon of said composition.

References Cited in the file of this patent

UNITED STATES PATENTS

| | | |
|---|---|---|
| 1,614,025 | Conner | Jan. 11, 1927 |
| 2,167,556 | Smull | July 25, 1939 |
| 2,501,665 | Evans et al. | Mar. 28, 1950 |
| 2,508,043 | Schaefer | May 16, 1950 |
| 2,596,137 | Frast | May 13, 1952 |
| 2,688,611 | Jones | Sept. 9, 1954 |

OTHER REFERENCES

Brauns et al.: The Nature of Lignin in Redwood Bark, article in Paper Trade Journal, vol. 119, No. 22, Nov. 30, 1944, pp. 34 and 35.